United States Patent [19]

Peterson et al.

[11] Patent Number: 4,921,203
[45] Date of Patent: May 1, 1990

[54] SPRING ELEMENT FOR A SHOCK ISOLATING MOUNT

[75] Inventors: Francis C. Peterson, Woodbury; Robert J. Despins, Madison, both of Conn.

[73] Assignee: Buell Industries, Inc., Waterbury, Conn.

[21] Appl. No.: 303,816

[22] Filed: Jan. 30, 1989

[51] Int. Cl.⁵ .............................................. B62D 27/04
[52] U.S. Cl. .................... 248/635; 267/141.1; 296/35.1; 411/525
[58] Field of Search ............... 248/635, 632, 637, 634, 248/638, 560; 267/141.1, 141.2; 296/35.1, 190; 180/312, 89.12; 403/365, 326, 390; 411/108, 525, 526, 527, 528, 529

[56] References Cited

U.S. PATENT DOCUMENTS

| | | | |
|---|---|---|---|
| 696,534 | 4/1902 | Assel | 411/526 |
| 2,458,409 | 1/1949 | Paige | 411/526 |
| 2,520,757 | 8/1950 | Cain | |
| 2,739,615 | 3/1956 | Wurzel | 138/46.5 |
| 2,798,748 | 7/1957 | Maurer | |
| 2,950,937 | 8/1960 | Bedford, Jr. | 287/126 |
| 3,027,609 | 4/1962 | Parkin | 411/526 |
| 3,218,101 | 11/1965 | Adams | 296/35.1 |
| 3,483,789 | 12/1969 | Wurzel | 85/8.8 |
| 3,809,427 | 5/1974 | Bennett | 296/35.1 |
| 3,893,221 | 7/1975 | Lehmann | 411/526 |
| 4,014,588 | 3/1972 | Kohriyama | 296/35 |
| 4,213,718 | 7/1980 | Lumby | 248/635 |
| 4,286,777 | 9/1981 | Brown | 267/63 |
| 4,390,210 | 6/1983 | Wisniewski | 297/452 |
| 4,513,990 | 4/1985 | Morita | 280/725 |
| 4,720,075 | 1/1988 | Peterson et al. | 248/635 |
| 4,783,039 | 11/1988 | Peterson et al. | 248/635 |

FOREIGN PATENT DOCUMENTS 586608 3/1947 United Kingdom .

Primary Examiner—Ramon O. Ramirez
Assistant Examiner—Robert A. Olson
Attorney, Agent, or Firm—St.Onge Steward Johnston & Reens

[57] ABSTRACT

A spring element for a shock isolating mount is adapted for multiple assembling and disassembling. The spring element comprises an annular segment having holding tabs extending radially inwardly from one end thereof; and aligning tabs which are shorter and wider than the holding tabs, and which extend radially inwardly from the same end of the annular segment.

9 Claims, 2 Drawing Sheets

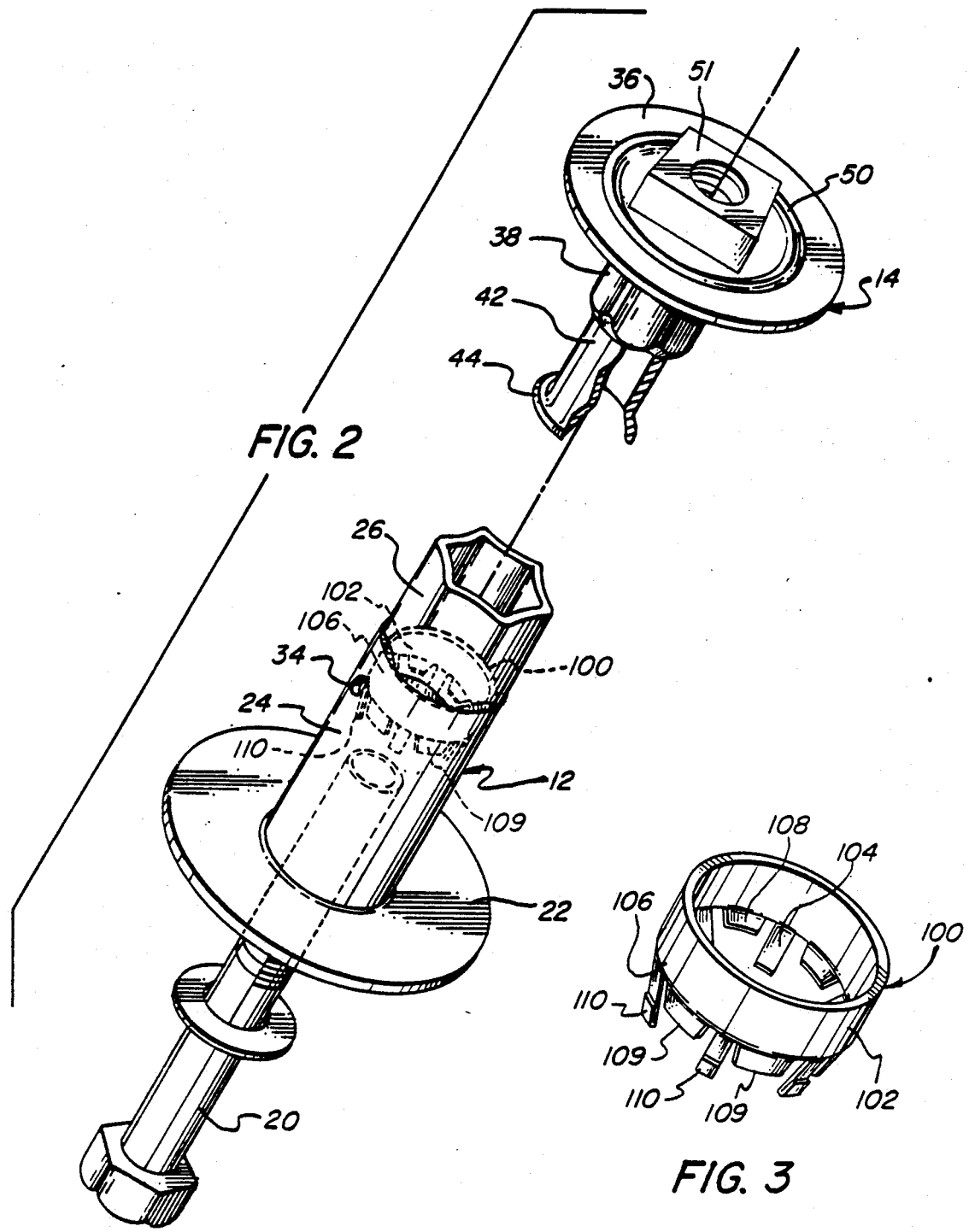

SPRING ELEMENT FOR A SHOCK ISOLATING MOUNT

FIELD OF THE INVENTION

The present invention relates to a spring element for a shock isolating mount used in securing part of a heavy structure, such as a vehicle body, to a support, such as the frame of the vehicle, and absorbing vibrations or shocks between the two structures.

BACKGROUND OF THE INVENTION a well known shock isolating mount currently used in the automotive industry for securing and supporting the body or cab of a vehicle on its frame comprises two mating rings of elastically resilient material between which a body mounting part such as an ear protruding from the vehicle is engaged and clamped by a two-part spool that is seated on the vehicle frame and fixed to it by a threaded fastener. The spool parts have flanges which bear against the opposite sides of the mating rings and are threaded together so that by turning one spool part relative to the other the elastic rings and the body mounting part between them are clamped tightly between the flanges. One of the spool parts is a tubular spacer having an annular flange integral with a deep drawn tube that is internally left hand threaded. The other spool part is a thimble having an annular flange integral with a deep drawn tube that is externally left-hand threaded to fit inside and engage its thread with the screw thread of the tubular spacer. A torque nut is welded to the outer face of the thimble flange.

The mating elastic rings of the prior art are provided with an oblong projection and an oblong cavity so that they may be mated only when the projection and cavity are properly aligned.

This known shock mount is assembled by inserting the spacer tube through the center of one of the mating elastic rings, and through an opening in the body mounting part. The second mating elastic ring is then fitted over the end of the spacer tube. The end of the thimble tube is placed in the end of the spacer tube, and the thimble is turned to thread it into the spacer tube and clamp the elastic rings tightly together on the body mounting part. Then, the spool assembly and body part is seated in place on the vehicle frame, and the threaded fastener is passed up through an opening in the frame, through the tubes and the assembled spool parts, and is threaded into the nut welded onto the thimble until the entire assembly is fixed securely to the frame.

It has been found that several practical drawbacks impede effective fastening by the prior art assembly.

During production line assembly of the spool parts crossing and jamming of the left-hand thread can and sometimes does occur, preventing the assembly from clamping together properly. An additional drawback of the known assembly becomes apparent if cross-threading of the threaded fastener and the welded nut occurs, because torque applied to the fastener in an attempt to unscrew the threaded fastener can instead cause the left-hand threaded thimble to unscrew from the spacer, jamming the entire assembly so that the unit must be cut off. The jamming and cross-threading can slow or stop the production line, increasing manufacturing cost.

The problems associated with this known shock mount have been addressed in U.S. Pat. No. 4,720,075, issued Jan. 19, 1988, and in U.S. Pat. No. 4,783,039, issued Nov. 8, 1988, in both of which we are a co-inventor, and the disclosures of which are hereby incorporated by reference in their entirety.

These patents disclose a two-part telescoping spool including a spacer and a thimble. Two mating resilient rings are mounted on each of the spacer and thimble, and the support part of a vehicle frame is disposed between these rings. An elongate fastening device engages the thimble and allows the simultaneous securing of a body mounting part and clamping of the support part. The thimble and the spacer have mutually engaging means for limiting rotation of either of them relative to the other. Preferably, the spacer tube is formed at its axial end opposite the spacer flange into a polygon, as viewed in cross-section. The thimble tube is formed at the tube shoulder adjacent the thimble flange into a complementary polygonal shape, so that the thimble polygon formation can be received in the spacer polygon formation, preventing rotation of the two members relative to each other. The two-part spool further includes means on the inside of the spacer member for engaging an end portion of the thimble member for resisting separation of the spacer and thimble members when the thimble tube is received in the spacer tube. The engaging means comprises a plurality of inward protrusions, which is disclosed as a six tooth washer, located inside the spacer tube so that the teeth engage an enlarged end of the thimble tube.

The present invention improves upon the six tooth washer disclosed in our prior applications, and provides a retaining spring element adapted for repeated coupling and uncoupling of the parts of the shock mount.

SUMMARY OF INVENTION

It is an object of the present invention to provide a spring element useful in a shock mount of the type making use of a spacer and a telescoping thimble for clamping together elastically resilient rings between which is disposed a support part of a vehicle frame, and in which a single fastening device serves the dual functions of drawing the parts of the shock mount together and securing the shock mount assembly and vehicle frame to a body mounting part, and in which the spacer and the thimble are prevented from rotating relative to the other.

It is a further object of the invention to provide a spring element which is adapted to repeated assembly and disassembly of the spacer and component parts without loss of effective axial retention of the thimble in the spacer.

In accordance with the invention, the spring element comprises an annular segment having holding tabs extending radially inwardly from one end thereof, and aligning tabs which are shorter and wider than the holding tabs, extending radially inwardly from the same end of the annular segment. The holding tabs advantageously have bent over ends; preferably the aligning tabs are located alternately with the holding tabs. Most preferably, the aligning tabs and the holding tabs extend radially inwardly at substantially the same angle, and there are six each of the aligning tabs and holding tabs.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 2 is a perspective view of the spacer and thimble components oriented for assembly.

FIG. 3 is a perspective view of a spring element for engaging the thimble member.

DETAILED DESCRIPTION OF THE PREFERRED EMBODIMENT

Figure 1:
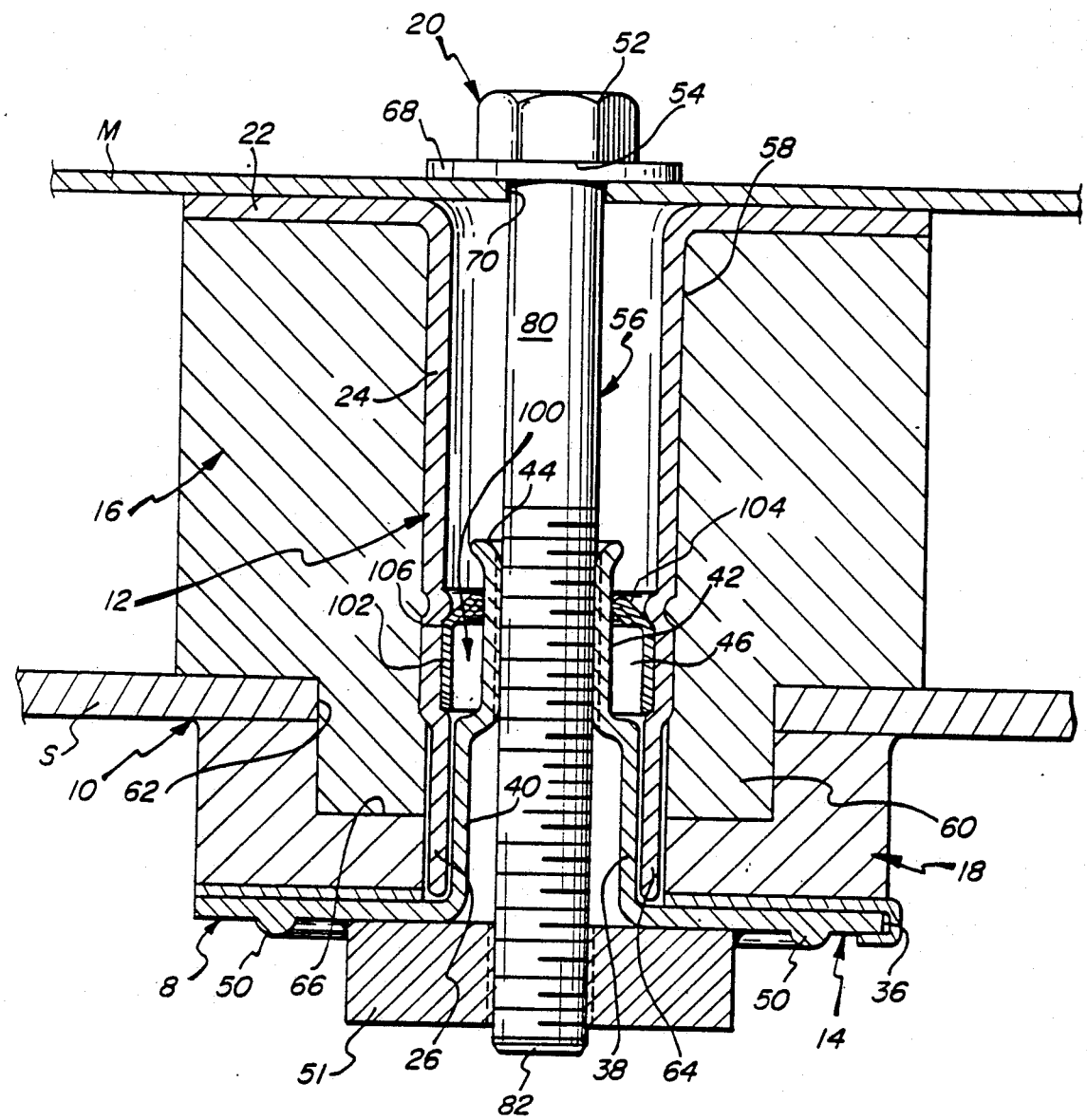
FIG. 1 is a vertical cross-sectional view of the assembled shock isolating mount.

As shown in FIGS. 1 and 2, a shock isolator assembly is generally indicated at 10, and comprises a two-part spool, generally indicated at 8, which includes a spacer, generally indicated at 12, a thimble, generally indicated at 14, a first elastically resilient mating ring, generally indicated at 16, a second elastically resilient mating ring, generally indicated at 18, and a threaded fastener, generally indicated at 20. The spacer 12, shown in FIGS. 1 and 2, includes an annular flange 22 integral with a tube 24 extending perpendicularly from the flange 22. Spacer tube 24 for a portion of the its axial end opposite the spool flange 22 when viewed in axial cross-section, has the form of a polygon, shown as a hexagon portion 26.

The thimble 14 is telescopically insertable into the spacer 12. The thimble includes an annular thimble flange 36 integral with a thimble tube 38. The thimble flange 36 is formed with a raised ring 50 located on the axial face opposite the thimble tube 38. Threaded nut 51 is spot welded onto the flange 36, and the raised ring 50 serves to center the threaded hole of the nut 51 over the thimble tube 38. The thimble tube 38 has two distinct portions 40 and 42. The tube shoulder portion 40 located between the thimble flange 36 and tube cylindrical portion 42 is formed into a polygon shape when viewed in axial cross-section, which in the preferred embodiment is a hexagon. The hexagon shoulder portion 40 is congruent with shape of the spacer tube portion 26, but has a perimeter slightly less than the perimeter of the interior of the hexagon portion 26. The thimble tube hexagonal shoulder 40 may thus be fitted into the spacer tube hexagonal portion 26, such that each piece engages the other, and neither the spacer nor the thimble will rotate relative to each other.

The thimble is further formed with a tube cylindrical portion 42 extending beyond the hexagonal shoulder portion 40. The thimble tube cylindrical portion has an outer diameter which is less than the outer diameter of the thimble tube hexagonal shoulder.

A spring element 100 is held in place in the spacer tube end 26 opposite the spacer flange 22 by the constriction of the tube caused by forming a portion of the tube end into a hexagon 26. The spring element 100 is held in place at the spacer flange end by two indents 34 in the spacer tube wall.

Spring element 100 comprises an annular segment 102 having holding tabs 104 extending radially inwardly from one end 106, and aligning tabs 108 which are shorter and wider (and therefore stiffer or less resilient) than holding tabs 104, and which extend radially inwardly from the same end 106. Preferably, the aligning tabs 108 are substantially trapezoidal and taper in width from their base connected to the annular segment 102 to their tips 109. Preferably, the holding tabs 104 are substantially rectangular, narrow metal strips having spring resilient qualities over at least a portion of their length, and preferably have bent over tips 110 to minimize the possibility of injury to workers. Advantageously, the holding tabs 104 are located alternately with the aligning tabs 108. Preferably, the holding tabs 104 and the aligning tabs 108 extend radially inwardly at substantially the same angle as each other.

Since the aligning tabs 108 are shorter than the holding tabs 104, the tips 109 of the aligning tabs 108 when considered together define a substantially circular figure which has a radius which is greater than the radius of the substantially circular figure defined by the tips 110 of the holding tabs 104. Preferably, there are six of the holding tabs 104, and six of the aligning tabs 108.

The spring element 100 is located in the spacer tube 24 with the holding and aligning tabs 104 and 108 located on the end of said annular segment 102 nearest the spacer flange 22 and extending axially towards the spacer flange 22.

The thimble tube cylindrical portion 42 has an axial length such that when the thimble 14 is inserted into the spacer the cylindrical portion extends beyond the tips 110 of the tabs of spring element 100. The cylindrical portion 42 of the thimble tube has an enlarged end 44. The radius of the circular figure defined by the tips 109 of the aligning tabs 108 is substantially equal to or greater than the radius of the enlarged end 44. The radius of the circular figure defined by the tips 110 of the holding tabs 104 is less than the radius of the enlarged end 44. Thus the enlarged end 44 may pass freely through the aligning tabs 108 but is held in place once it is pushed through the holding tabs 104.

When the thimble tube 38 is inserted into the spacer tube 24 the thimble tube enlarged end 44 is engaged by the spring element 100. The spring element tabs 104 and 108 may, for example, be bent away from the spacer tube 24 walls at an angle of approximately 45 degrees to allow the thimble tube enlarged end 44 to be easily pressed into the spring element 100. The spring element 100 is made from a resilient material, such as spring steel or plastic, so that the tabs 104 will bend towards the walls of tube 24 when the thimble tube enlarged end 44 passes through the circle described by the tips 110 of the six holding tabs 104, yet will return to their original inclination after the thimble tube enlarged end 44 has seated in the spring element 100. Once inserted, the thimble 14 is prevented from accidental disengagement from the spool 12 by the engagement of the aligning tabs 108 as well as the holding tabs 104 on the enlarged end 44.

The spring element 100 of the present invention provides axial retention of the thimble 14 and spacer 12 despite repeated assembly and disassembly because the aligning tabs 108, which, as noted, are wider and stiffer than the holding tabs 104, guide the enlarged end 44 of the thimble 14 into the space defined by the holding tabs 104 so that the holding tabs 104 are not bent or damaged by the insertion of the thimble end 44 into the spring element 100.

During removal of the thimble end 44 from the spring element 100, the aligning tabs 108 serve the same function and prevent damage or bending of the holding tabs 104 by limiting the range of movement of the thimble.

The threaded fastener 20 includes a head 52 configured to be engaged by a tool for applying torque about the fastener axis. The fastener further includes a shank, generally indicated at 56 that extends perpendicularly from the load bearing surface 54 and includes a cylindrical, unthreaded portion 80 and a threaded portion 82 that extends coaxially with the unthreaded portion 80.

The threaded portion 82 is adapted to be received by the threaded nut 51.

The threaded fastener 20 is inserted through a washer 68 and an opening 70 in the body mounting part M through the center of and coaxially with spacer tube 24. The threaded fastener 20 engages the nut 51 and when tightened, clamps the assembly together and secures it to the support, to provide a reliable and secure isolator and fastening assembly.

The present invention enhances the economy and reliability of assembly of a shock mount since the spacer and thimble assembly may be easily aligned and engaged.

What is claimed is:

1. In an assembly for securing a mounting part of structure onto a support, of the type comprising a rigid spacer member having a spacer flange and a spacer tube integral with the spacer flange and projecting from said spacer flange to extend through apertures in resilient bodies, said spacer tube having a plurality of inwardly directed protrusions; a rigid thimble member having a thimble flange and a thimble tube integral with the thimble flange and projecting from said thimble flange, said thimble tube being receivable inside and displaceable axially relative to said spacer tube, said thimble member and said spacer member having mutually engaging means for limiting rotation of either of them relative to the other, said thimble tube having an enlarged end having a substantially circular cross-section engageable by said inwardly directed protrusions; an elongate fastening device having a shank, a head portion, and an end portion, said shank extending through said spacer tube, and said end portion having means operable by manipulation of said fastening device to draw said thimble tube into said spacer tube and thereby draw said spacer and thimble flanges together and against said bodies, whereby the support is clamped between said bodies and flanges and said mounting part is secured between said head portion of said fastening device and one of said flanges; the improvement wherein said plurality of inwardly directed protrusions are provided by a spring element comprising:

an annular segment having
resilient holding tabs, extending radially inwardly from one end thereof, the tips of which define a substantially circular figure having a radius which is less than the radius of the enlarged end of said thimble; and aligning tabs extending radially inwardly from said one end of said annular segment, said aligning tabs being shorter and wider than said holding tabs, the tips of said aligning defining a substantially circular figure having a radius which is greater than the radius of the substantially circular figure defined by the tips of the holding tabs and which is greater than or equal to the radius of the enlarged end of said thimble.

2. In an assembly in accordance with claim 1, a spring element wherein said holding tabs have bent over ends.

3. In an assembly in accordance with claim 2, a spring element wherein said aligning tabs are located alternately with said holding tabs.

4. In an assembly in accordance with claim 3, a spring element wherein said holding tabs and said aligning tabs extend radially inwardly at substantially the same angle.

5. In an assembly in accordance with claim 4, a spring element wherein there are six of said holding tabs, and six of said aligning tabs.

6. In an assembly in accordance with claim 5, wherein said spring element is located in said spacer member with said holding and aligning tabs located on the end of said annular segment nearest said spacer flange and extending in the direction of said spacer flange.

7. In an assembly for securing a mounting part of structure onto a support, of the type comprising: a rigid spacer member having a spacer flange and a spacer tube integral with the spacer flange and projecting from said spacer flange to extend through apertures in resilient bodies, said spacer tube having a plurality of inwardly directed protrusions; a rigid thimble member having a thimble flange and a thimble tube integral with the thimble flange and projecting from said thimble flange, said thimble tube being receivable inside and displaceable axially relative to said spacer tube, said thimble member and said spacer member having mutually engaging means for limiting rotation of either of them relative to the other, said thimble tube having an enlarged end engageable by said inwardly directed protrusions; an elongate fastening device having a shank, a head portion, and an end portion, said shank extending through said spacer tube, and said end portion having means operable by manipulation of said fastening device to draw said thimble tube into said spacer tube and thereby draw said spacer and thimble flanges together and against said bodies, whereby the support is clamped between said bodies and flanges and said mounting part is secured between said head portion of said fastening device and one of said flanges; the improvement wherein said plurality of inwardly directed protrusions are provided by a spring element comprising:

an annular segment having
resilient holding tabs formed of narrow strips, extending radially inwardly from one end thereof, the tips of which define a substantially circular figure having a radius which is less than the radius of the enlarged end of said thimble, and having bent over ends; and
substantially trapezoidal aligning tabs extending radially inwardly from said one end of said annular segment alternately with said holding tabs at substantially the same inward angle as said holding tabs, said aligning tabs being shorter and wider than said holding tabs, the tips of said aligning tabs defining a substantially circular figure having a radius which is greater than the radius of the substantially circular figure defined by the tips of the holding tabs and which is substantially equal to the radius of the enlarged end of said thimble.

8. In an assembly in accordance with claim 7, a spring element wherein there are six of said holding tabs, and six of said aligning tabs.

9. In an assembly in accordance with claim 8, wherein said spring element is located in said spacer member with said holding and aligning tabs located on the end of said annular segment nearest said spacer flange and extending in the direction of said spacer flange.

* * * * *